United States Patent
Hoerold et al.

(10) Patent No.: US 9,534,109 B2
(45) Date of Patent: Jan. 3, 2017

(54) FLAME RETARDANT-STABILIZER COMBINATION FOR THERMOPLASTIC POLYMERS

(75) Inventors: Sebastian Hoerold, Diedorf (DE); Wolfgang Wanzke, Augsburg (DE); Elke Schlosser, Augsburg (DE)

(73) Assignee: Clariant International Ltd., Muttenz (CH)

( * ) Notice: Subject to any disclaimer, the term of this patent is extended or adjusted under 35 U.S.C. 154(b) by 85 days.

(21) Appl. No.: 13/809,716

(22) PCT Filed: Jul. 6, 2011

(86) PCT No.: PCT/EP2011/003358
§ 371 (c)(1),
(2), (4) Date: Jan. 11, 2013

(87) PCT Pub. No.: WO2012/007124
PCT Pub. Date: Jan. 19, 2012

(65) Prior Publication Data
US 2013/0109792 A1      May 2, 2013

(30) Foreign Application Priority Data
Jul. 13, 2010    (DE) .................. 10 2010 026 973

(51) Int. Cl.
| | |
|---|---|
| C08K 13/02 | (2006.01) |
| C08K 5/00 | (2006.01) |
| C08K 5/16 | (2006.01) |
| C08K 5/3492 | (2006.01) |
| C08K 5/524 | (2006.01) |
| C08K 5/5313 | (2006.01) |

(52) U.S. Cl.
CPC ............. *C08K 13/02* (2013.01); *C08K 5/0066* (2013.01); *C08K 5/16* (2013.01); *C08K 5/34922* (2013.01); *C08K 5/524* (2013.01); *C08K 5/5313* (2013.01)

(58) Field of Classification Search
CPC . C08K 5/3492; C08K 5/34926; C08K 5/3462; C08K 13/02; C08K 5/0066; C08K 5/16; C08K 5/524; C08K 5/5313; C08K 5/34922; C09D 5/18; C09K 21/02
USPC .................. 524/100; 252/602, 601
See application file for complete search history.

(56) References Cited

U.S. PATENT DOCUMENTS

| | | |
|---|---|---|
| 3,900,444 A | 8/1975 | Racky et al. |
| 4,036,811 A | 7/1977 | Noetzel et al. |
| 4,439,572 A * | 3/1984 | Kindrick ............. C08K 3/0083 106/18.27 |
| 6,013,707 A | 1/2000 | Kleiner et al. |
| 6,207,736 B1 | 3/2001 | Nass et al. |
| 6,270,560 B1 | 8/2001 | Kleiner et al. |
| 6,365,071 B1 | 4/2002 | Jenewein et al. |
| 6,509,401 B1 | 1/2003 | Jenewein et al. |
| 6,547,992 B1 * | 4/2003 | Schlosser ............. C08K 5/5313 252/609 |
| 7,255,814 B2 * | 8/2007 | Hoerold ................. C08K 5/17 252/609 |
| 2006/0089435 A1 * | 4/2006 | Hoerold et al. ............. 524/115 |
| 2006/0167138 A1 | 7/2006 | Ishii et al. |
| 2012/0083558 A1 | 4/2012 | Bayer et al. |

FOREIGN PATENT DOCUMENTS

| | | |
|---|---|---|
| DE | 2252258 | 5/1974 |
| DE | 2447727 | 4/1976 |
| DE | 19614424 | 10/1997 |
| DE | 19734437 | 2/1999 |
| DE | 19737727 | 7/1999 |
| DE | 19920276 | 11/2000 |
| EP | 0699708 | 3/1996 |
| EP | 0964886 | 12/1999 |
| EP | 1511802 | 3/2005 |
| EP | 1537173 | 6/2005 |
| WO | PCT/EP97/01664 | 10/1997 |
| WO | WO97/39053 | 10/1997 |
| WO | WO 2008/154600 | 12/2008 |
| WO | WO 2010/030478 | 3/2010 |
| WO | WO 2010/139369 | 12/2010 |

OTHER PUBLICATIONS

PCT International Search Report for PCT/EP2011/003358, mailed Sep. 6, 2011.
English Abstract for DE 19920276, Nov. 9, 2000.
H. Zweifel (ed.): "Plastics Additive Handbook," 5$^{th}$ Edition, Carl Hanser Verlag, Munich, pp. 80 to 84, (2000).
English Translation of the PCT International Preliminary Report on Patentability for PCT/EP2011/003358, mailed Jan. 15, 2013.

* cited by examiner

*Primary Examiner* — Frances Tischler
(74) *Attorney, Agent, or Firm* — Anthony A. Bisulca

(57) ABSTRACT

A flame retardant-stabilizer combination for thermoplastic polymers, comprising as component A a phosphinic salt of the formula (I) and/or of a diphosphinic salt of the formula (II) and/or polymers thereof, as component B a nitrogen-containing synergist or a phosphorus/nitrogen flame retardant, and as component C a metal oxide coated with a metal salt and/or metal hydroxide coated with a metal salt.

17 Claims, No Drawings

FLAME RETARDANT-STABILIZER COMBINATION FOR THERMOPLASTIC POLYMERS

The invention relates to a flame retardant-stabilizer combination for thermoplastic polymers and to polymeric molding compositions which comprise such flame retardant-stabilizer combinations.

But for a few exceptions, thermoplastic polymers are processed in the melt. Barely any polymer withstands the associated changes in structure and state without any change in its chemical structure. Crosslinking, oxidation, changes in molecular weight and hence also changes in the physical and technical properties may be the result. In order to reduce stress on the polymers during processing, different additives are added according to the polymer. Stabilizers are often added, which suppress or at least slow the alteration processes, such as crosslinking or degradation reactions. In many cases, lubricants are added, which have the primary task of improving the flow characteristics of the melt.

In general, different additives are used at the same time. For instance, antioxidants and stabilizers are used in order that the polymer withstands processing without chemical damage and then has a sufficient period of stability with respect to outside influences such as heat, UV light, weathering and oxygen (air). In addition to improving flow characteristics, lubricants prevent excessive adhesion of the polymer melt to hot machine parts and act as a dispersant for pigments, fillers and reinforcers.

The use of flame retardants can influence the stability of the polymer in the course of processing in the melt. Flame retardants frequently have to be added in high dosages in order to ensure sufficient flame retardancy of the polymer according to international standards. Due to their chemical reactivity, which is required for flame retardancy at high temperatures, flame retardants can impair the processing stability of polymers. This may result, for example, in increased polymer degradation, crosslinking reactions, outgassing or discoloration. These adverse effects occur only in attenuated form, if at all, in the case of polymer processing without flame retardant.

Without the addition of flame retardants, polyamides are stabilized, for example, by small amounts of copper halides, and also aromatic amines and sterically hindered phenols, with emphasis on the achievement of long-term stability at high use temperatures (H. Zweifel (ed.): "Plastics Additives Handbook", 5$^{th}$ Edition, Carl Hanser Verlag, Munich, 2000, pages 80 to 84). Polyesters also require antioxidative stabilization essentially for sustained use, not for the processing operation.

Especially for thermoplastic polymers, the salts of phosphinic acids (phosphinates) have been found to be effective flame-retardant additives (DE-A-2 252 258 and DE-A-2 447 727). Calcium phosphinates and aluminum phosphinates have been described as particularly effective in polyesters and impair the material properties of the polymer molding compositions to a lesser degree than the alkali metal salts (EP-A-0 699 708).

In addition, synergistic combinations of phosphinates with particular nitrogen-containing compounds have been found, and these have been found to be more effective as flame retardants in a whole series of polymers than the phosphinates alone (PCT/EP97/01664, and also DE-A-197 34 437 and DE-A-197 37 727).

For stabilization of polymer molding compositions with phosphor-containing flame retardants, carbodiimides, isocyanates and isocyanurates have been found to be effective (DE-A-199 20 276).

Especially in the case of use of phosphorus-containing flame retardants in polyamides and polyesters, the efficacy of the stabilizers described to date has been found to be inadequate, specifically for countering the effects which occur in the course of processing, such as discoloration and decreasing molecular weight.

DE-A-196 14 424 describes phosphinates in conjunction with nitrogen synergists in polyesters and polyamides. DE-A-199 33 901 describes phosphinates in combination with melamine polyphosphate as a flame retardant for polyesters and polyamides. In the case of use of these very effective flame retardants, there may be partial polymer degradation and discoloration of the polymer, especially at processing temperatures above 300° C. In the course of extrusion and injection molding, troublesome evolution of smoke is observed in some cases.

EP-A-1 537 173 describes the addition of basic or amphoteric oxides, hydroxides, carbonates, silicates, borates, stannates, mixed oxide-hydroxides, oxide-hydroxide-carbonates, hydroxide-silicates or hydroxide-borates or mixtures of these substances in the case of use of phosphinates or mixtures thereof with nitrogen-containing synergists as flame retardants. Disadvantages in the case of addition of basic metal oxides, for example zinc oxide, magnesium oxide or calcium oxide, or metal hydroxides such as magnesium hydroxide, are the poor mechanical properties of the flame-retardant polymers thus produced.

It was therefore an object of the present invention to provide flame retardant combinations for thermoplastic polymers which, as well as flame retardancy, also exert a stabilizing effect on the polymer, and feature good mechanical properties, no exudation, no discoloration under processing conditions and good glow wire resistance. This object is achieved by the addition of coated metal oxides.

The invention therefore provides a flame retardant-stabilizer combination for thermoplastic polymers, comprising as component A 30 to 79.9% by weight of a phosphinic salt of the formula (I) and/or of a diphosphinic salt of the formula (II) and/or polymers thereof

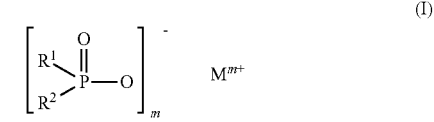

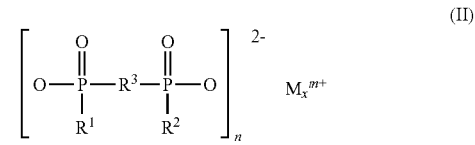

in which
R$^1$, R$^2$ are the same or different and are each H, C$_1$-C$_{18}$-alkyl, C$_6$-C$_{18}$-aryl, C$_7$-C$_{18}$-arylalkyl and/or C$_7$-C$_{18}$-alkylaryl;
R$^3$ is linear or branched C$_1$-C$_{10}$-alkylene, C$_6$-C$_{10}$-arylene, -alkylarylene or -arylalkylene;
M is Mg, Ca, Al, Sb, Sn, Ge, Ti, Zn, Fe, Zr, Ce, Bi, Sr, Mn, Li, Na, K and/or a protonated nitrogen base;
m is 1 to 4;
n is 1 to 4;

x is 1 to 4,
as component B 20 to 50% by weight of a nitrogen-containing synergist and/or of a phosphorus/nitrogen flame retardant and
as component C 0.1 to 20% by weight of a metal oxide and/or metal hydroxide coated with a metal salt, component C comprising 50 to 95% by weight of metal oxide and/or metal hydroxide and 5 to 50% by weight of metal salt and the sum of components A to C always being 100% by weight.

It has been found that, surprisingly, inventive combinations of phosphinic salts (I) or diphosphinic salts (II) or polymers thereof and nitrogen-containing synergists and/or phosphorus/nitrogen flame retardants have much-improved stability on incorporation into polymers when particular metal oxides with a specific coating are added. The metal oxide is preferably surrounded by a sparingly soluble salt of the same metal. The salt preferably comprises phosphates, molybdates, sulfides or sulfates. The compounds are preferably zinc, magnesium, calcium or manganese compounds.

The inventive combinations reduce the discoloration of the polymers in the course of processing in the melt and suppress the degradation of the polymers to units of lower molecular weight. At the same time, flame retardancy is fully maintained, glow wire resistance is improved, and barely any exudation is observed. It is also found that, surprisingly, as a result of the inventive additions, evolution of smoke in the course of extrusion and injection molding completely disappears.

Preferably, $R^1$, $R^2$ are the same or different and are each linear, branched or cyclic $C_1$-$C_6$-alkyl, and/or phenyl and/or H.

More preferably, $R^1$, $R^2$ are the same or different and are each methyl, ethyl, n-propyl, isopropyl, n-butyl, tert-butyl, n-pentyl, cyclohexyl and/or phenyl.

Preferably, $R^3$ is methylene, ethylene, n-propylene, isopropylene, n-butylene, tert-butylene, n-pentylene, n-octylene or n-dodecylene; phenylene or naphthylene; methylphenylene, ethylphenylene, tert-butylphenylene, methylnaphthylene, ethylnaphthylene or tert-butylnaphthylene; phenylmethylene, phenylethylene, phenylpropylene or phenylbutylene.

Component B preferably comprises condensation products of melamine and/or reaction products of melamine with polyphosphoric acid and/or reaction products of condensation products of melamine with polyphosphoric acid or mixtures thereof.

Component B preferably comprises melem, melam, melon, dimelamine pyrophosphate, melamine polyphosphate, melem polyphosphate, melam polyphosphate, melon polyphosphate and/or mixed poly salts thereof.

Component C preferably comprises nitrogen-containing phosphates of the formulae $(NH_4)_y H_{3-y} PO_4$ and $(NH_4 PO_3)_z$, where y is 1 to 3 and z is 1 to 10,000.

Component C preferably comprises ammonium hydrogenphosphate, ammonium dihydrogenphosphate and/or ammonium polyphosphate.

Component C preferably also comprises nitrogen-containing synergists of the formulae (III) to (VIII) or mixtures thereof

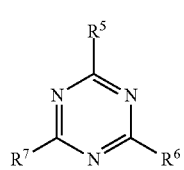

(III)

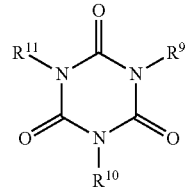

(IV)

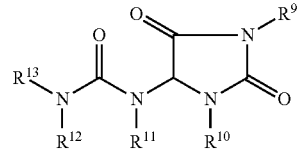

(V)

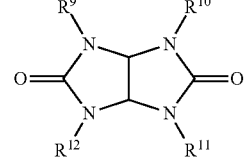

(VI)

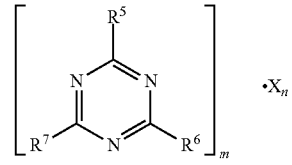

(VII)

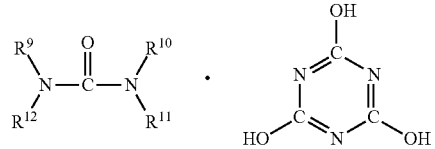

(VIII)

in which
$R^5$ to $R^7$ are each hydrogen, $C_1$-$C_8$-alkyl, $C_5$-$C_{16}$-cycloalkyl or -alkylcycloalkyl, possibly substituted by a hydroxyl function or a $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl, —$OR_8$ and —$N(R^8)R^9$, and also N-alicyclically or N-aromatically,
$R^8$ is hydrogen, $C_1$-$C_8$-alkyl, $C_5$-$C_{16}$-cycloalkyl or -alkylcycloalkyl, possibly substituted by a hydroxyl function or a $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl,
$R^9$ to $R^{13}$ are the same groups as $R^8$, and also —O—$R^8$,
m and n are each independently 1, 2, 3 or 4,
X denotes acids which can form adducts with triazine compounds (III);
or oligomeric esters of tris(hydroxyethyl) isocyanurate with aromatic polycarboxylic acids.

Preferably, component C comprises benzoguanamine, tris(hydroxyethyl) isocyanurate, allantoin, glycoluril, melamine, melamine cyanurate, dicyandiamide and/or guanidine.

Preferably, the metal oxide of component C comprises magnesium oxide, calcium oxide, zinc oxide, manganese oxide and/or tin oxide, and the metal hydroxide is magnesium hydroxide, zinc hydroxide and/or calcium hydroxide.

Preferably, the metal salt of component C, which is present as a coating on the metal oxide, is zinc phosphate, zinc molybdate, zinc sulfide, zinc sulfate, zinc stearate, basic zinc silicate, zinc stannate, magnesium phosphate, magnesium sulfate, magnesium hydroxide, calcium phosphate, calcium sulfate, calcium carbonate, zinc hydroxide, tin oxide hydrate and/or manganese hydroxide.

The coated metal oxides can be prepared, for example, as described in U.S. Pat. No. 4,439,572 for zinc oxide. A zinc oxide-zinc salt mixture is obtained by dispersing the zinc oxide on the surface in the corresponding acid of the desired zinc salt, stirring for a period and then filtering off. The product is a zinc oxide coated with the zinc salt and is used as a fume reducer for PVC.

If zinc oxide is dispersed in 10% phosphoric acid at 60 to 80° C. and then filtered off, zinc oxides coated with 5 to 50% by weight of zinc phosphate are obtained. Such a product is commercially available as Kemgard® 981. It is analogously possible to use magnesium oxide and phosphoric acid to obtain a magnesium phosphate-coated magnesium oxide. It is possible to proceed analogously with calcium oxide, tin oxide or manganese oxide. With sulfuric acid, oxides coated with sulfates are obtained.

The flame retardant-stabilizer combination preferably comprises 50 to 78% by weight of component A, 20 to 40% by weight of component B and 2 to 20% by weight of component C.

The inventive flame retardant-stabilizer combination preferably further comprises antioxidants, UV absorbers, light stabilizers, metal deactivators, peroxide-destroying compounds, polyamide stabilizers, basic costabilizers, nucleating agents, fillers, reinforcers, further flame retardants and/or further additions.

The invention also relates to a flame-retardant polymer molding composition comprising a flame retardant-stabilizer combination as claimed in one or more of claims 1 to 14, wherein the polymer comprises thermoplastic polymers of the HI (high-impact) polystyrene, polyphenylene ether, polyamide, polyester or polycarbonate type, and blends or polymer blends of the ABS (acrylonitrile-butadiene-styrene) or PC/ABS (polycarbonate/acrylonitrile-butadiene-styrene) or PPE/HIPS (polyphenylene ether/HI polystyrene) polymer type.

The flame-retardant polymer molding composition preferably comprises 2 to 50% by weight of flame retardant-stabilizer combination and 50 to 98% by weight of polymer molding composition.

The flame-retardant polymer molding composition more preferably comprises 10 to 30% by weight of flame retardant-stabilizer combination and 70 to 90% by weight of polymer molding composition.

The invention also relates to polymer moldings, films, filaments and fibers comprising a flame retardant-stabilizer combination as claimed in one or more of claims 1 to 14 and/or a polymer molding composition as claimed in claim 15 or 16.

The polymer of the polymer moldings, films, filaments and fibers preferably comprises HI (high-impact) polystyrene, polyphenylene ethers, polyamides, polyesters or polycarbonates and blends or polymer blends of the ABS (acrylonitrile-butadiene-styrene) or PC/ABS (polycarbonate/acrylonitrile-butadiene-styrene), polyamide, polyester and/or ABS type.

The polymer moldings, films, filaments and fibers preferably comprise 2 to 50% by weight of flame retardant-stabilizer combination and 50 to 98% by weight of polymer.

M is preferably calcium, aluminum or zinc.

Suitable phosphinates are described in PCT/WO97/39053, which is explicitly incorporated by reference.

Particularly preferred phosphinates are aluminum, calcium and zinc phosphinates.

The melamine polyphosphates are preferably reaction products of melamine with condensed phosphoric acids or reaction products of condensation products of melamine with condensed phosphoric acids, and mixtures of the products mentioned.

The melamine polyphosphates are understood to mean compounds which form through reaction of melamine or the condensed melamine compounds, such as melam, melem or melon etc., with condensed phosphoric acid. Examples thereof are melamine polyphosphate, melam polyphosphate, melon polyphosphate and melem polyphosphate, or mixed poly salts, as described, for example, in WO-A-98/39306.

A component B of particularly good suitability is melamine polyphosphate.

More preferably, component C comprises magnesium oxide coated with magnesium phosphate.

More preferably, component C comprises zinc oxide coated with zinc phosphate, zinc molybdate or zinc stannate.

The inventive flame retardant-stabilizer combination may also comprise carbodiimides.

The polymer more preferably comprises polyamides, polyesters and PPE/HIPS blends.

The polymer molding composition more preferably comprises the inventive flame retardant-stabilizer combination in a total amount of 10 to 30% by weight, based on the polymer content.

The polymer moldings, films, filaments and fibers more preferably comprise the inventive flame retardant-stabilizer combination in a total amount of 10 to 30% by weight, based on the polymer content.

In a particular embodiment, the polymer moldings, films, filaments and fibers comprise, based on the polymer content, 2 to 30% by weight of the inventive flame retardant-stabilizer combination, consisting of 30 to 79.9% by weight of component A, 20 to 50% by weight of component B and 0.1 to 20% by weight of component C.

The flame retardant-stabilizer combination is preferably in the form of pellets, flakes, fine grains, powder and/or micronizate.

The flame retardant-stabilizer combination is preferably in the form of a physical mixture of the solids, of a melt mixture, of a compactate, of an extrudate, or in the form of a masterbatch.

The inventive flame retardant-stabilizer combination may additionally comprise carbodiirnides.

The polymer more preferably comprises polyamides, polyesters and PPE/HIPS blends.

The polymer moldings, films, filaments and fibers preferably comprise the flame retardant-stabilizer combination in a total amount of 2 to 50% by weight, based on the polymer content. The amount of polymer is then 50 to 98% by weight.

The polymer moldings, films, filaments and fibers more preferably comprise the flame retardant-stabilizer combination in a total amount of 10 to 30% by weight, based on the polymer content. The amount of polymer is then 70 to 90% by weight.

The aforementioned additives can be introduced into the polymer in a wide variety of different process steps. For instance, it is possible in the case of polyamides or polyesters, at the start or at the end of the polymerization/polycondensation or in a subsequent compounding operation, to mix the additives into the polymer melt. In addition, there are processing operations in which the additives are not added until a later stage. This is practiced especially in the case of use of pigment or additive masterbatches. There is also the possibility of applying additives, particularly in pulverulent form, to the polymer pellets, which may be warm as a result of the drying operation, by drum application.

The flame retardant-stabilizer combination is preferably in the form of pellets, flakes, fine grains, powder and/or micronizate.

The flame retardant-stabilizer combination is preferably in the form of a physical mixture of the solids, of a melt mixture, of a compactate, of an extrudate, or in the form of a masterbatch.

The inventive flame retardant-stabilizer combination can be used in thermoplastic and thermoset polymers, as defined in detail below.

Suitable polyesters derive from dicarboxylic acids and esters thereof and diols and/or from hydroxycarboxylic acids or the corresponding lactones. Particular preference is given to using terephthalic acid and ethylene glycol, propane-1,3-diol and butane-1,3-diol.

Suitable polyesters include polyethylene terephthalate, polybutylene terephthalate (Celanex® 2500, Celanex® 2002, from Celanese; Ultradur®, from BASF), poly-1,4-dimethylolcyclohexane terephthalate, polyhydroxybenzoates, and block polyether esters which derive from polyethers with hydroxyl end groups; and also polyesters modified with polycarbonates or MBS.

The flame-retardant polyester molding compositions produced in accordance with the invention are preferably used in polyester moldings.

Preferred polyester moldings are filaments, fibers, films and moldings, which comprise mainly terephthalic acid as the dicarboxylic acid component and mainly ethylene glycol as the diol component.

Preferably, the resulting phosphorus content in filaments and fibers produced from flame-retardant polyester is 0.1-18%, preferably 0.5-15%, and, in the case of films, 0.2-15%, preferably 0.9-12% by weight.

Suitable polystyrenes are polystyrene, poly(p-methylstyrene) and/or poly(alpha-methylstyrene).

The suitable polystyrenes are preferably copolymers of styrene or alpha-methylstyrene with dienes or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate; more impact-resistant mixtures of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.

The suitable polystyrenes are preferably also graft copolymers of styrene or alpha-methylstyrene, for example styrene onto polybutadiene, styrene onto polybutadiene-styrene or polybutadiene-acrylonitrile copolymers, styrene and acrylonitrile (or methacrylonitrile) onto polybutadiene; styrene, acrylonitrile and methyl methacrylate onto polybutadiene; styrene and maleic anhydride onto polybutadiene; styrene, acrylonitrile and maleic anhydride or maleimide onto polybutadiene; styrene and maleimide onto polybutadiene, styrene and alkyl acrylates or alkyl methacrylates onto polybutadiene, styrene and acrylonitrile onto ethylene-propylene-diene terpolymers, styrene and acrylonitrile onto polyalkyl acrylates or polyalkyl methacrylates, styrene and acrylonitrile onto acrylate-butadiene copolymers, and mixtures thereof, as known, for example, as what are called ABS, MBS, ASA or AES polymers.

The polymers are preferably polyamides and copolyamides which derive from diamines and dicarboxylic acids and/or from aminocarboxylic acids or the corresponding lactams, such as nylon-2,12, nylon-4, nylon-4,6, nylon-6, nylon-6,6, nylon-6,9, nylon-6,10, nylon-6,12, nylon-6,66, nylon-7,7, nylon-8,8, nylon-9,9, nylon-10,9, nylon-10,10, nylon-11, nylon-12, etc. These are known, for example, by the trade names Nylon®, from DuPont, Ultramid®, from BASF, Akulon® K122, from DSM, Zytel® 7301, from DuPont; Durethan® B 29, from Bayer and Grillamid®, from Ems Chemie.

Also suitable are aromatic polyamides proceeding from m-xylene, diamine and adipic acid; polyamides prepared from hexamethylenediamine and iso- and/or terephthalic acid and optionally an elastomer as a modifier, for example poly-2,4,4-trimethylhexamethyleneterephthalamide or poly-m-phenyleneisophthalamide, block copolymers of the aforementioned polyamides with polyolefins, olefin copolymers, ionomers or chemically bound or grafted elastomers, or with polyethers, for example with polyethylene glycol, polypropylene glycol or polytetramethylene glycol. In addition, EPDM- or ABS-modified polyamides or copolyamides; and polyamides condensed during processing ("RIM polyamide systems").

The invention finally also relates to a process for producing flame-retardant polymer moldings, wherein inventive flame-retardant polymer molding compositions are processed by injection molding (for example injection molding machine of the Aarburg Allrounder type) and pressing, foam injection molding, internal gas pressure injection molding, blow molding, film casting, calendering, laminating or coating at elevated temperatures to give the flame-retardant polymer molding.

Preferably, the thermoset polymers comprise unsaturated polyester resins (UP resins) which derive from copolyesters of saturated and unsaturated dicarboxylic acids or anhydrides thereof with polyhydric alcohols, and vinyl compounds as crosslinking agents. UP resins are cured by free-radical polymerization with initiators (e.g. peroxides) and accelerators.

Preferred unsaturated dicarboxylic acids and derivatives for preparation of the polyester resins are maleic anhydride and fumaric acid.

Preferred saturated dicarboxylic acids are phthalic acid, isophthalic acid, terephthalic acid, tetrahydrophthalic acid, adipic acid.

Preferred diols are 1,2-propanediol, ethylene glycol, diethylene glycol and neopentyl glycol, neopentyl glycol, ethoxylated or propoxylated bisphenol A.

A preferred vinyl compound for crosslinking is styrene.

Preferred curative systems are peroxides and metal coinitiators, for example hydroperoxides and cobalt octanoate and/or benzoyl peroxide and aromatic amines and/or UV light and photosensitizers, e.g. benzoin ethers.

Preferred hydroperoxides are di-tert-butyl peroxide, tert-butyl peroctoate, tert-butyl perpivalate, tert-butyl per-2-ethylhexanoate, tert-butyl permaleate, tert-butyl perisobutyrate, benzoyl peroxide, diacetyl peroxide, succinyl peroxide,p-chlorobenzoyl peroxide, dicyclohexyl peroxodicarbonate.

Preferably, initiators are used in amounts of 0.1 to 20% by weight, preferably 0.2 to 15% by weight, based on the mass of all comonomers.

Preferred metal coinitiators are compounds of cobalt, manganese, iron, vanadium, nickel or lead. Preferably, metal coinitiators are used in amounts of 0.05 to 1% by weight, based on the mass of all comonomers.

Preferred aromatic amines are dimethylaniline, dimethyl-p-toluene, diethylaniline and phenyldiethanolamine.

In one process for preparing flame-retardant copolymers, at least one ethylenically unsaturated dicarboxylic anhydride derived from at least one $C_4$-$C_8$-dicarboxylic acid, at least one vinylaromatic compound and a polyol are copolymerized, and reacted with inventive adducts of alkylphosphonous acid derivatives and diester-forming olefins.

In one process for producing flame-retardant thermoset compositions, a thermoset resin is mixed with an inventive flame retardant-stabilizer combination and optionally further flame retardants, synergists, stabilizers, additives and fillers or reinforcers, and the resulting mixture is wet pressed at pressures of 3 to 10 bar and temperatures of 20 to 60° C. (cold pressing).

In a further process for producing flame-retardant thermoset compositions, a thermoset resin is mixed with an inventive flame retardant-stabilizer combination and optionally further flame retardants, synergists, stabilizers, additives and fillers or reinforcers, and the resulting mixture is wet pressed at pressures of 3 to 10 bar and temperatures of 80 to 150° C. (warm or hot pressing).

Preferably, the polymers are crosslinked epoxy resins which derive from aliphatic, cycloaliphatic, heterocyclic or aromatic glycidyl compounds, for example from bisphenol A diglycidyl ethers, bisphenol F diglycidyl ethers, which are crosslinked by means of customary hardeners and/or accelerators.

Suitable glycidyl compounds are bisphenol A diglycidyl esters, bisphenol F diglycidyl esters, polyglycidyl esters of phenol formaldehyde resins and cresol-formaldehyde resins, polyglycidyl esters of phthalic acid, isophthalic acid and terephthalic acid, and of trimellitic acid, N-glycidyl compounds of aromatic amines and heterocyclic nitrogen bases, and di- and polyglycidyl compounds of polyhydric aliphatic alcohols.

Suitable hardeners are aliphatic, cycloaliphatic, aromatic and heterocyclic amines or polyamines, such as ethylenediamine, diethylenetriamine triethylenetetramine, propane-1,3-diamine, hexamethylenediamine, aminoethylpiperazine, isophoronediamine, polyamidoamine, diaminodiphenylmethane, diaminodiphenyl ether, diaminodiphenyl sulfone, aniline-formaldehyde resins, 2,2,4-trimethylhexane-1,6-diamine, m-xylylenediamine, bis(4-aminocyclohexyl)methane, 2,2-bis(4-aminocyclohexyl)propane, 3-aminomethyl-3,5,5-trimethylcyclohexylamine (isophoronediamine), polyamidoamines, cyanoguanidine and dicyandiamide, and likewise polybasic acids or anhydrides thereof, for example phthalic anhydride, maleic anhydride, tetrahydrophthalic anhydride, methyltetrahydrophthalic anhydride, hexahydrophthalic anhydride and methylhexahydrophthalic anhydride, and also phenols, for example phenol-novolac resin, cresol-novolac resin, dicyclopentadiene-phenol adduct resin, phenol aralkyl resin, cresolaralkyl resin, naphtholaralkyl resin, biphenol-modified phenolaralkyl resin, phenol-trimethylolmethane resin, tetraphenylolethane resin, naphthol-novolac resin, naphthol-phenol cocondensate resin, naphthol-cresol cocondensate resin, biphenol-modified phenol resin and aminotriazine-modified phenol resin. All hardeners can be used alone or in combination with one another.

Suitable catalysts or accelerators for the crosslinking in the polymerization are tertiary amines, benzyldimethylamine, N-alkylpyridines, imidazole,1-methylimidazole, 2 methylimidazole, 2-ethyl-4-methylimidazole, 2-ethyl-4-methylimidazole, 2 phenylimidazole, 2-heptadecylimidazole, metal salts of organic acids, Lewis acids and amine complex salts.

The formulation of the invention may also comprise other additives which are commonly used in epoxy resin formulations, such as pigments, dyes and stabilizers.

Epoxy resins are suitable for potting of electrical or electronic components and for saturation and impregnation processes. In electrical engineering, epoxy resins are predominantly rendered flame-retardant and used for printed circuit boards and insulators.

Preferably, the polymers are crosslinked polymers which derive from aldehydes on the one hand, and phenols, urea or melamine on the other hand, such as phenol-formaldehyde, urea-formaldehyde and melamine-formaldehyde resins. The polymers preferably comprise crosslinkable acrylic resins which derive from substituted acrylic esters, for example from epoxy acrylates, urethane acrylates or polyester acrylates.

Preferably, the polymers are alkyd resins, polyester resins and acrylate resins which have been crosslinked with melamine resins, urea resins, isocyanates, isocyanurates, polyisocyanates or epoxy resins.

Preferred polyols are alkene oxide adducts of ethylene glycol, 1,2-propanediol, bisphenol A, trimethylolpropane, glycerol, pentaerythritol, sorbitol, sugars, degraded starch, ethylenediamine, diaminotoluene and/or aniline, which serve as initiators. The preferred alkoxylating agents preferably contain 2 to 4 carbon atoms, particular preference being given to ethylene oxide and propylene oxide.

Preferred polyester polyols are obtained by polycondensation of a polyalcohol such as ethylene glycol, diethylene glycol, propylene glycol, 1,4-butanediol, 1,5-pentanediol, methylpentanediol, 1,6-hexanediol, trimethylolpropane, glycerol, pentaerythritol, diglycerol, glucose and/or sorbitol, with a dibasic acid such as oxalic acid, malonic acid, succinic acid, tartaric acid, adipic acid, sebacic acid, maleic acid, fumaric acid, phthalic acid and/or terephthalic acid. These polyester polyols can be used alone or in combination.

Suitable polyisocyanates are aromatic, alicyclic or aliphatic polyisocyanates having not fewer than two isocyanate groups and mixtures thereof. Preference is given to aromatic polyisocyanates such as tolyl diisocyanate, methylene diphenyl diisocyanate, naphthylene diisocyanate, xylylene diisocyanate, tris(4-isocyanatophenyl)methane and polymethylenepolyphenylene diisocyanates; alicyclic polyisocyanates such as methylenediphenyl diisocyanate, tolyl diisocyanate; aliphatic polyisocyanates and hexamethylene diisocyanate, isophorone diisocyanate, dimeryl diisocyanate, 1,1-methylenebis(4-isocyanatocyclohexane-4,4'-diisocyanatodicyclohexylmethane isomer mixture, 1,4-cyclohexyl diisocyanate, Desmodur® products (Bayer) and lysine diisocyanate and mixtures thereof.

Suitable polyisocyanates are modified products which are obtained by reaction of polyisocyanate with polyol, urea, carbodiimide and/or biuret.

Preferably, the weight ratio of the polyisocyanate to polyol is 170 to 70 parts by weight, preferably 130 to 80 parts by weight, based on 100 parts by weight of the polyol.

Preferably, the weight ratio of the catalyst is 0.1 to 4 parts by weight, more preferably 1 to 2 parts by weight, based on 100 parts by weight of the polyol.

Preferred blowing agents for polyurethanes are water, hydrocarbons, hydrochlorofluorocarbon, hydrofluorocarbon etc. The amount of the blowing agent for polyurethanes is 0.1 to 1.8 parts by weight, preferably 0.3 to 1.6 parts by weight and especially 0.8 to 1.6 parts by weight, based on 100 parts by weight of the polyol.

Preference is given to using the mixture in a molding composition of a polyamide or of a polyester. Suitable polyamides are described, for example, in DE-A-199 20 276.

The polyamides are preferably those of the amino acid type and/or of the diamine-dicarboxylic acid type.

The polyamides are preferably nylon-6, nylon-6,10, nylon-10,10, nylon-12, nylon-4,6, nylon-11 and/or nylon-6,6.

The polyamides are preferably unmodified, colored, filled, unfilled, reinforced, unreinforced, or else differently modified.

The polyesters are preferably polyethylene terephthalate or polybutylene terephthalate.

The polyesters are preferably unmodified, colored, filled, unfilled, reinforced, unreinforced, or else differently modified.

It is optionally possible to add further additives to the polymer. The additives added may be waxes, light stabilizers, other stabilizers, antioxidants, antistats or mixtures of such additives.

The preferred stabilizers used may be phosphonites, phosphites or carbodiimides.

The aforementioned additives can also be added to the flame retardant-stabilizer combination.

EXAMPLES

1. Components Used
Commercial polymers (pellets):
nylon-6,6 (N 6,6-GR): Ultramid® A27 (from BASF AG, Germany)
polybutylene terephthalate (PBT): Ultradur® B4500 (from BASF AG, Germany)
Glass fibers:
Vetrotex® 983 EC 10 4.5 mm (from Saint-Gobain-Vetrotex, Germany)
Vetrotex® 952 EC 10 4.5 mm (from Saint-Gobain-Vetrotex, Germany)
Flame retardant (component A):
aluminum salt of diethylphosphinic acid, referred to as DEPAL
Flame retardant (component B, inventive):
melamine polyphosphate (referred to as MPP), Melapur® 200 (from Ciba SC, Switzerland)
Component C (comparative):
zinc borate, Firebrake® ZB and Firebrake® 500, from Borax, USA
active zinc oxide, from Rheinchemie, Germany
zinc phosphate, Sigma-Aldrich, Germany
Component C (inventive):
Kemgard® 981 (zinc oxide-zinc phosphate mixture), from Sherwin-Williams, USA
Kemgard® 911B (zinc oxide-zinc molybdate mixture), from Sherwin-Williams, USA
2. Production, Processing and Testing of Flame-Retardant Polymer Molding Compositions:

The flame retardant components were mixed with one another in the ratio specified in the table and incorporated via the side intake of a twin-screw extruder (Leistritz ZSE 27/44D) into N 6,6 at temperatures of 260 to 310° C., and into PBT at 250 to 275° C. The glass fibers were added via a second side intake. The homogenized polymer strand was drawn off, cooled in a water bath and then pelletized. After sufficient drying, the molding compositions were processed to test specimens on an injection molding machine (Arburg 320 C Allrounder) at melt temperatures of 250 to 300° C., and tested and classified for flame retardancy using the UL 94 test (Underwriter Laboratories).

The UL 94 fire classifications are as follows:

V-0: afterflame time never longer than 10 sec, total of afterflame times for 10 flame applications not more than 50 sec, no flaming drops, no complete consumption of the specimen, afterglow time for specimens never longer than 30 sec after end of flame application V-1: afterflame time never longer than 30 sec after end of flame application, total of afterflame times for 10 flame applications not more than 250 sec, afterglow time for specimens never longer than 60 sec after end of flame application, other criteria as for V-0

V-2: cotton indicator ignited by flaming drops, other criteria as for V-1 not classifiable (ncl): does not comply with fire classification V-2.

The flowability of the molding compositions was determined by finding the melt volume flow rate (MVR) at 275° C./12.16 kg. A sharp rise in the MVR value indicates polymer degradation.

The processing properties in polyester were assessed on the basis of the specific viscosity (SV). The pellets of the polymer molding composition were used, after sufficient drying, to produce a 1.0% solution in dichloroacetic acid and the SV was determined. The higher the SV, the lesser the extent of polymer degradation during the incorporation of the flame retardant.

All tests in the respective series, unless stated otherwise, were performed under identical conditions (temperature programs, screw geometry, injection molding parameters, etc.) due to comparability.

Table 1 shows comparative examples in which a flame retardant combination based on the aluminum salt of diethylphosphinic acid (DEPAL) and the nitrogen-containing synergist melamine polyphosphate (MPP) and the metal oxide or borate or phosphate alone were used. The incorporation of the flame retardants into N 6,6 leads to polymer degradation, recognizable by high MVR values, and to marked exudation. Only a GWIT of 750° C. is attained.

The results of the examples in which the flame retardant mixture according to the invention was used can be found in table 2. All amounts are reported as % by weight and are based on the polymer molding composition including the flame retardant combination and additives.

It is clear from the examples that the inventive mixture of the phosphinate, melamine polyphosphate and coated metal oxide (zinc oxide) components improves the processability of the polymers, without impairing flame retardancy. Barely any exudation is observed, the low melt indices show low polymer degradation, the mechanical values are high and a GWIT of 775° C. is attained.

Unless stated otherwise, the amounts are always in % by weight.

TABLE 1

N 6,6 GF 30 test results. C1-C4 are comparative examples

|  | C-1 | C-2 | C-3 | C-4 |
|---|---|---|---|---|
| Nylon-6,6 | 49.55 | 49.55 | 49.55 | 49.55 |
| 983 glass fibers | 30 | 30 | 30 | 30 |
| A: DEPAL | 12.6 | 12.6 | 12.6 | 12.6 |
| B: MPP | 6.4 | 6.4 | 6.4 | 6.4 |
| C1: zinc borate | 1 |  |  |  |
| C2: zinc oxide |  | 1 |  | 0.5 |

TABLE 1-continued

N 6,6 GF 30 test results. C1-C4 are comparative examples

|  | C-1 | C-2 | C-3 | C-4 |
|---|---|---|---|---|
| C3: zinc phosphate |  |  | 1 | 0.5 |
| D: CaV 102 | 0.25 | 0.25 | 0.25 | 0.25 |
| E: P-EPQ | 0.20 | 0.20 | 0.20 | 0.20 |
| UL 94 0.8 mm | V-0 | V-0 | V-0 | V-0 |
| GWIT 0.75 mm | 750° C. | 750° C. | 750° C. | 750° C. |
| MVR 275° C./2.16 kg | 8 | 16 | 17 | 12 |
| Polymer strand | smooth | rough | rough | rough |
| Exudation* | marked | marked | marked | marked |
| Color | white | white | gray | white |
| Impact resistance [kJ/m$^2$] | 65 | 50 | 62 | 53 |
| Notched impact resistance [kJ/m$^2$] | 9 | 5 | 7 | 6 |

*14 days, 100% humidity, 70° C.

TABLE 2

N 6,6 GF 30 test results. Inventive examples I1-I4

|  | I-1 | I-2 | I-3 | I-4 |
|---|---|---|---|---|
| Nylon-6,6 | 49.55 | 49.55 | 50.05 | 50.05 |
| 983 glass fibers | 30 | 30 | 30 | 30 |
| A: DEPAL | 12.6 | 12.6 | 12.6 | 12.6 |
| B: MPP | 6.4 | 6.4 | 6.4 | 6.4 |
| C4: Kemgard 981 | 1 |  | 0.5 |  |
| C5: Kemgard 911B |  | 1 |  | 0.5 |
| D: CaV 102 | 0.25 | 0.25 | 0.25 | 0.25 |
| E: P-EPQ | 0.20 | 0.20 | 0.20 | 0.20 |
| UL 94 0.8 mm | V-0 | V-0 | V-0 | V-0 |
| GWIT 0.75 mm | 775° C. | 775° C. | 775° C. | 775° C. |
| MVR 275° C./2.16 kg | 6 | 7 | 9 | 10 |
| Polymer strand | smooth | smooth | smooth | smooth |
| Exudation* | low | low | low | low |
| Color | white | white | white | white |
| Impact resistance [kJ/m$^2$] | 62 | 64 | 62 | 63 |
| Notched impact resistance [kJ/m$^2$] | 8 | 8 | 7 | 7 |

*14 days, 100% humidity, 70° C.

Table 3 shows comparative examples C5-C8, in which a flame retardant combination based on the aluminum salt of diethylphosphinic acid (DEPAL) and the nitrogen-containing synergist melamine polyphosphate (MPP) and the metal oxide or borate or phosphate alone is used in polyester (PBT). Fire class UL 94 V-0 is attained, but marked polymer degradation is observed, recognizable by low SV numbers and poor mechanical values.

The inventive mixture (table 3, examples 1-5 and 1-6) composed of the phosphinate, melamine polyphosphate and coated metal oxide (zinc oxide) components markedly reduces polymer degradation, recognizable by high SV numbers and better mechanical parameters.

Both in polyamides and in polyesters, Kemgard® 981 (zinc oxide coated with zinc phosphate) achieves a better result than a physical mixture of zinc oxide and zinc phosphate.

TABLE 3

PBT GF 25 test results. C5-8 are comparative examples, I5 and I6 inventive flame retardant-stabilizer mixture

|  | C-5 | C-6 | C-7 | C-8 | I-5 | I-6 |
|---|---|---|---|---|---|---|
| PBT | 54.55 | 54.55 | 54.55 | 54.55 | 54.55 | 54.55 |
| 952 glass fibers | 25 | 25 | 25 | 25 | 25 | 25 |

TABLE 3-continued

PBT GF 25 test results. C5-8 are comparative examples, I5 and I6 inventive flame retardant-stabilizer mixture

|  | C-5 | C-6 | C-7 | C-8 | I-5 | I-6 |
|---|---|---|---|---|---|---|
| A: DEPAL | 13 | 13 | 13 | 13 | 13 | 13 |
| B: MPP | 6.5 | 6.5 | 6.5 | 6.5 | 6.5 | 6.5 |
| C1: zinc borate | 0.5 |  |  |  |  |  |
| C2: zinc oxide |  | 0.5 |  | 0.25 |  |  |
| C3: zinc phosphate |  |  | 0.5 | 0.25 |  |  |
| C4: Kemgard 981 |  |  |  |  | 0.5 |  |
| C5: Kemgard 911B |  |  |  |  |  | 0.5 |
| D: Licowax E | 0.25 | 0.25 | 0.25 | 0.25 | 0.25 | 0.25 |
| E: P-EPQ | 0.20 | 0.20 | 0.20 | 0.20 | 0.20 | 0.20 |
| UL 94 0.8 mm | V-0 | V-1 | V-0 | V-0 | V-0 | V-0 |
| Color | white | white | white | white | white | white |
| Solution viscosity SV* | 1005 | 1110 | 1210 | 1181 | 1332 | 1320 |
| Elongation at break [%] | 1.7 | 1.2 | 1.9 | 1.5 | 2.2 | 2.2 |
| Impact resistance [kJ/m$^2$] | 40 | 34 | 39 | 36 | 49 | 47 |
| Notched impact resistance [kJ/m$^2$] | 6.3 | 5.6 | 6.2 | 5.8 | 7.6 | 7.5 |

*in dichloroacetic acid, pure PBT (uncompounded) gives 1450

The invention claimed is:

1. A flame-retardant polymer molding composition comprising a polymer and a flame retardant-stabilizer combination, wherein the polymer comprises thermoplastic polymers of HI (high-impact) polystyrene, polyphenylene ether, polyamide, polyester or polycarbonate, blends or polymer blends of the ABS (acrylonitrile-hutadiene-styrene), PC/ABS (polycarbonate/acrylonitril-butadiene-styrene) or PPE/HIPS (polyphenlene ether/HI polystyrene) polymer, wherein the flame-retardant-stabilizer composition comprises as component A 30 to 79,9% by weight of a phosphinic salt of the formula (I), a diphosphinic salt of the formula (II), polymers thereof or mixtures thereof

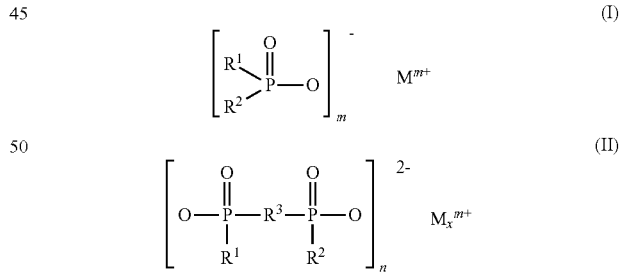

wherein
R$^1$, R$^2$ are the same or different and are H, C$_1$-C$_{18}$-alkyl, C$_7$-C$_{18}$-arylalkyl, C$_7$-C$_{18}$-alkylarl or mixtures thereof;
R$^3$ is a linear or branched C$_1$-C$_{10}$-alkylene, C$_6$-C$_{10}$-arylene, -alkylarylene or -arylalkylene;
M is Mg, Ca, Al, Sb, Sn, Ge, Ti, Zn, Fe, Zr, Ce, Bi, Sr, Mn, Li, Na, K a protonated nitrogen base or a mixture thereof;
m is 1 to 4;
n is 1 to 4;
x is 1 to 4, as component B 20 to 50% by weight of a nitrogen-containing synergist, a phosphorus/nitrogen flame retardant or a mixture thereof and as component C 0.1 to 20% by weight of a metal oxide coated with a metal salt and/or a metal hydroxide coated with a metal salt, wherein the metal oxide is selected from the group consisting of magnesium oxide, calcium oxide, zinc oxide, manganese oxide, tin oxide and mixtures, and wherein the metal salt is selected from the group consisting of zinc phosphate, zinc molybdate, zinc stannate, magnesium phosphate, calcium phosphate and mixtures thereof, component C comprising 50 to 95% by weight of the metal oxide, and 5 to 50% by weight of the metal salt and the sum of components A to C always being 100% by weight.

2. The flame-retardant polymer molding composition as claimed in claim 1, wherein $R^1$, $R^2$ are the same or different and are linear, branched or cyclic $C_1$-$C_6$-alkyl, phenyl, H or mixtures thereof.

3. The flame-retardant polymer molding composition as claimed in claim 1, wherein $R^1$, $R^2$ are the same or different and are methyl, ethyl, n-propyl, isopropyl, n-butyl, tert-butyl, n-pentyl, cyciohexyl, phenyl or mixtures thereof.

4. The flame-retardant polymer molding composition as claimed in claim 1, wherein $R^3$ is methylene, ethylene, n-propylene, isopropylene, n-butylene, tert-butylene, n-pentylene, n-octylene, n-dodecylene; phenylene, naphthylene; methylphenylene, ethylphenylene, tert-butylphenylene, methylnaphthylene, ethylnaphthylene, tert-butylnaphthylene; phenylmethylene, phenylethylene, phenylpropylene or phenylbutylene.

5. The flame-retardant polymer molding composition as claimed in claim 1, wherein component B comprises condensation products of melamine, reaction products of melamine with polyphosphoric acid, reaction products of condensation, products of melamine with polyphosphoric acid or mixtures thereof.

6. The flame-retardant polymer molding composition as claimed in claim 1, wherein component B comprises melem, melam, melon, dimelamine pyrophosphate, melamine polyphosphate, melem polyphosphate, melam polyphosphate, melon polyphosphate or mixed poly salts thereof.

7. The flame-retardant polymer molding composition as claimed in claim 1, wherein component B comprises nitrogen-containing phosphates of the formulae $(NH_4)_y H_{3-y} PO_4$ and $(NH_4 PO_3)_z$, where y is 1 to 3 and z is 1 to 10000.

8. The flame-retardant polymer molding composition as claimed in claim 7, wherein component B comprises ammonium hydrogenphosphate, ammonium dihydrogenphosphate, ammonium polyphosphate or mixtures thereof.

9. The flame-retardant polymer molding composition as claimed in claim 1, wherein component B is a nitrogen-containing synergist of the formulae (III) to (VIII) or mixtures thereof

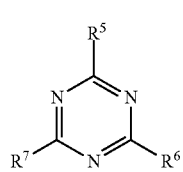
(III)

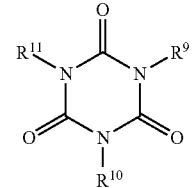
(IV)

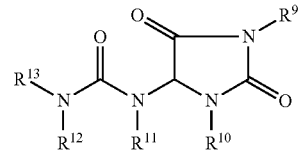
(V)

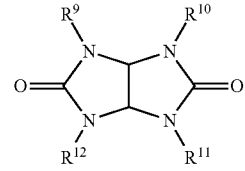
(VI)

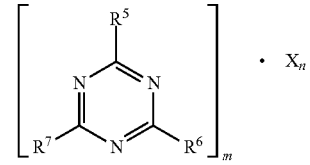
(VII)

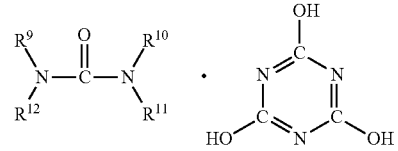
(VIII)

wherein
$R^5$ to $R^7$ are hydrogen, $C_1$-$C_8$-alkyl, $C_5$-$C_{16}$-cycloalkyl or -alkylcycloalkyl, optionally substituted by a hydroxyl function or a $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl, —$OR^8$ and —$N(R^8)R^9$, N-alicyclically or N-aromatically,
$R^8$ is hydrogen, $C_1$-$C_8$-alkyl, $C_5$-$C_{16}$-cycloalkyl or-alkylcycloalkyl, optionally substituted by a hydroxyl function or a $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl,
$R^9$ to $R^{13}$ are the same groups as $R^8$ or —O—$R^8$,
m and n are 1, 2, 3 or 4,
X is an acid which can form adducts with triazine compounds (III);
or oligomeric esters of tris(hydroxyethyl) isocyanurate with aromatic polycarboxylic acids.

10. The flame-retardant polmer molding compositionas claimed in claim 1, wherein component B comprises benzoguanamine, tris(hydroxyethyl) isocyanurate, allantoin, glycoluril, melamine, melamine cyanurate, clicyandiamide, guanidine or mixtures thereof.

11. The flame-retardant polymer molding composition as claimed in claim 1, wherein the metal oxide of component C comprises calcium oxide, zinc oxide or mixtures thereof, and the metal hydroxide is magnesium hydroxide, zinc hydroxide, calcium hydroxide or mixtures thereof.

12. The flame-retardant polymer molding composition as claimed in claim 1, wherein the metal salt of component C, which is present as a coating on the metal oxide, metal hydroxide or both is zinc phosphate, zinc molybdate, calcium phosphate or a mixture thereof.

13. The flame-retardant polymer molding composition as claimed in claim 1, comprising 50 to 78% by weight of component A, 20 to 40% by weight of component B and 2 to 20% by weight of component C.

14. The flame-retardant polymer molding composition as claimed in claim 1, further comprising antioxidants, UV absorbers, light stabilizers, metal deactivators, peroxide-destroying compounds, polyamicle stabilizers, basic costabilizers, nucleating agents, fillers, reinforcers, further flame retardants, further additives or a mixture thereof.

15. The flame-retardant polymer molding composition as claimed in claim 1 comprising 2 to 50% by weight of flame retardant-stabilizer combination and 50 to 98% by weight of polymer molding composition.

16. A polymer molding, film, filament or fiber comprising a flame retardant-stabilizer combination and a polymer, wherein the flame retardant-stabilizer combination comprises as component A 30 to 79.9% by weight of a phosphinic, salt of the formula (I), a diphosphinic salt of the formula (II), polymers thereof or mixtures thereof

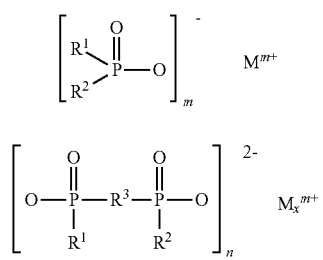

wherein $R^1$, $R^2$ are the same or different and are H, $C_1$-$C_{18}$-alkyl, $C_6$-$C_{18}$-aryl, $C_7$-$C_{18}$-arylalkyl $C_7$-$C_{18}$-alkylaryl or mixtures thereof;

$R^3$ is a linear or branched $C_1$-$C_{10}$-alkylene, $C_6$-$C_{10}$-arylene, -alkylarylene or -arylalkylene;

M is Mg, Ca, Al Sb, Sn, Ge, Ti, Zn, Fe, Zr, Ce, Bi Sr, Mn, Li, Na, K a protonated nitrogen base or a mixture thereof m is 1 to 4;

n is 1 to 4;

x is 1 to 4, as component B 20 to 50% by weight of a nitrogen-containing synergist, a phosphorus/nitrogen flame retardant or a mixture thereof and as component C 01 to 20% by weight of a metal oxide selected from the group consisting of magnesium oxide, calcium oxide, zinc oxide, manganese oxide, tin oxide and mixtures thereof coated with a metal salt selected from the group consisting of zinc phosphate, zinc molybdate, zinc stannate, magnesium phosphate, calcium phosphate and mixtures thereof, component C comprising 50 to 95% by weight of the metal oxide and 5 to 50% by weight of the metal salt and the sum of components A to C always being 100% by weight, wherein the polymer is HI (high-impact) polystyrene, polyphenylene ethers, polyamides, polyesters, polycarbonates, and blends or polymer blends of the ABS (acrylonitrile-butadiene-styrene), PC/ABS (polycarbonate/acrylonitrile-butadiene-styrene) ABS or mixtures thereof.

17. The polymer molding, film, filament or fiber as claimed in claim 16, comprising 2 to 50% by weight of the flame retardant-stabilizer combination and 50 to 98% by weight of the polymer.

* * * * *